United States Patent [19]

Murase et al.

[11] Patent Number: 5,207,493
[45] Date of Patent: May 4, 1993

[54] EDGE LIGHT PANEL DEVICE

[75] Inventors: Shinzo Murase; Hirokazu Matsui, both of Ohtsu, Japan

[73] Assignee: Kabushiki Kaisha Meitaku Shisutemu, Ohtsu, Japan

[21] Appl. No.: 725,661

[22] Filed: Jul. 3, 1991

[30] Foreign Application Priority Data

Jul. 3, 1990 [JP] Japan ................... 2-176546
Jul. 31, 1990 [JP] Japan ................... 2-204480

[51] Int. Cl.$^5$ ............................................. F21V 8/00
[52] U.S. Cl. ................................. 362/31; 362/297; 362/298
[58] Field of Search ............ 362/31, 26, 297, 307, 362/298

[56] References Cited

U.S. PATENT DOCUMENTS

| | | |
|---|---|---|
| 2,347,665 | 5/1944 | Christensen et al. |
| 4,729,068 | 3/1988 | Ohe . |
| 4,811,507 | 3/1989 | Blanchet . |
| 4,860,171 | 8/1989 | Kojima . |
| 4,909,604 | 3/1990 | Kabayashi et al. ............... 362/347 |
| 4,933,814 | 6/1990 | Sanai ................................ 362/31 |
| 4,937,709 | 6/1990 | Yanagi et al. . |
| 4,937,716 | 6/1990 | Whitehead ........................ 362/31 |
| 4,965,950 | 10/1990 | Yamada . |
| 4,974,122 | 11/1990 | Shaw ................................. 362/31 |
| 4,985,809 | 1/1991 | Matsui et al. ..................... 362/31 |
| 5,029,045 | 7/1991 | Sanai et al. ....................... 362/31 |
| 5,040,098 | 8/1991 | Tanaka et al. .................... 362/31 |
| 5,046,826 | 9/1991 | Iwamoto et al. ................. 362/31 |

FOREIGN PATENT DOCUMENTS

| | | |
|---|---|---|
| 57-128383 | 8/1982 | Japan . |
| 60-205576 | 10/1985 | Japan . |
| 62-902 | 1/1987 | Japan . |
| 2-126501 | 5/1990 | Japan . |

*Primary Examiner*—Richard R. Cole
*Attorney, Agent, or Firm*—Wenderoth, Lind & Ponack

[57] ABSTRACT

There is provided an edge light panel having a very even brightness. The edge light panel equipped with an irregular reflection layer and surrounded by a front surface diffusion layer, a rear surface reflection layer and peripheral edge reflection layers is additionally provided with margin reflection layers arranged along the front margin of the edge light panel, except along the peripheral edge juxtaposed with a primary light source. While the margin reflection layers may be separately arranged, they may also be integrally formed with the peripheral edge reflection layers, the rear surface reflection layer and the front surface diffusion layer. A narrow gap is advantageously provided between the edge light panel and the front surface diffusion layer and/or the rear surface reflection layer.

19 Claims, 7 Drawing Sheets

EDGE LIGHT PANEL DEVICE

BACKGROUND OF THE INVENTION

Field of the Invention

This invention relates to an edge light panel device of a surface light source device to be used for various illuminating apparatus such as a back light of a liquid crystal display, illuminated display or illuminated signboard, etc..

A surface light source device of this type normally comprises one or more primary light sources, e.g., fluorescent lamps, arranged respectively along an edge or edges of the edge light panel so that the light from the primary light sources is supplied to the edge light panel in order to evenly illuminate it and to serve as a surface light source.

An edge light panel device of the type under consideration normally comprises a single- or multi-layered transparent substrate having a thickness of several millimeters, typically five to six millimeters, and made of a material having a high light transmittivity such as acrylic resin, whose surface, normally its back side, is treated by screen printing with white ink to carry a pattern formed by a large number of dots with different surface areas for irregular reflection of light. The dots are arranged in such a manner that they show a smooth horizontal or vertical transition within the pattern, in order for the light beams led into the transparent substrate to be irregularly reflected within the substrate. In addition, a surface diffusion layer made of a white or milky white reflective sheet is normally arranged on both the front and back sides of the edge light panel to diffuse the light beams irregularly reflected within the panel and enhance the brightness of the edge light panel, and the surface diffusion layer on the back side is lined by a white or milky white reflective sheet or a metal foil to prevent the irregularly reflected light within the surface diffusion layer from escaping.

While a surface light source device as described above ensures a certain degree of even brightness, it is apt to produce round regions near the edges adjacent to the primary light source where the brightness level is lower than in the remaining regions particularly when the thickness of the transparent acrylic resin substrate used for the edge light panel is reduced from 2 to 3 millimeters relative to known substrates to 1.5 millimeters or less. Moreover, the means for irregular reflection of light, typically screen printed dots, may become visible through the surface diffusion layer to damage the evenness of the brightness of the surface light source panel as the transparent substrate is made thin.

While these problems may be solved to some extent by preparing a relatively thick surface diffusion layer by bonding two white sheets together, such a thick surface diffusion layer can significantly reduce the brightness of the surface light source device and is not feasible for practical applications.

Since an edge light panel device or a surface light source device comprising an edge light panel is often used for a back light of a liquid crystal display and installed in an apparatus containing the device and the display along with a keyboard, it is most desirable to have a very thin surface light source device in order to make the entire apparatus very small and compact. However, known edge light panels are unable to meet the requirements because of the problems as described above.

SUMMARY OF THE INVENTION

In view of the above problems, it is therefore the primary object of the present invention to provide an edge light panel device which is very thin and at the same time ensures very even brightness.

In the course of intensive research efforts in order to achieve the above object of the invention, the inventors of the present invention came to find that the problem of reduced and uneven brightness of a thin edge light panel can be effectively avoided by providing an edge light panel device comprising a transparent substrate provided with means for irregular reflection, a front surface diffusion layer arranged on the front surface of the edge light panel to substantially cover the front surface, a rear surface reflection layer arranged on the rear surface of the edge light panel to substantially cover the rear surface, a pair of peripheral edge reflection layers arranged on the respective opposite peripheral edges adjacent to the primary light source, and a pair of margin reflection layers arranged along the respective opposite edges adjacent to the primary light source on the front surface of the edge light panel. Such an arrangement additionally prevents the light introduced into the edge light panel from the primary light source from escaping through the edges, so as to enhance the brightness as well as the evenness of the brightness of the device.

Each of the margin reflection layers may be arranged separately or integrally with the related lateral side reflection layer, the rear surface reflection layer and/or the front surface diffusion layer. When it is made integral with the other related layers to form a frame-like holder of the edge light panel, it effectively prevents the edge light panel from being polluted by dirt due to static electricity. Alternatively, the margin reflection layers may be slightly spaced apart from the front surface diffusion layer and/or rear surface reflection layer in order to prevent the irregular reflection means from becoming visible on the front surface, to thereby enhance the degree of evenness of the brightness of the edge light panel.

Now the present invention will be described in greater detail by referring to the accompanying drawings that illustrate preferred embodiments of the invention.

BRIEF DESCRIPTION OF THE DRAWINGS

FIG. 2 is an exploded front view of the embodiment of FIG. 1.

DETAILED DESCRIPTION OF THE INVENTION

Referring first to FIGS. 1 through 5 that illustrate a word processor incorporating a first embodiment of the invention, reference numeral 1 generally denotes a portable word processor comprising a main body 2 provided with a keyboard section 3 and a display section 4 swingably connected to the main body 2 and capable of being folded to cover the keyboard section 3.

Figure 1:
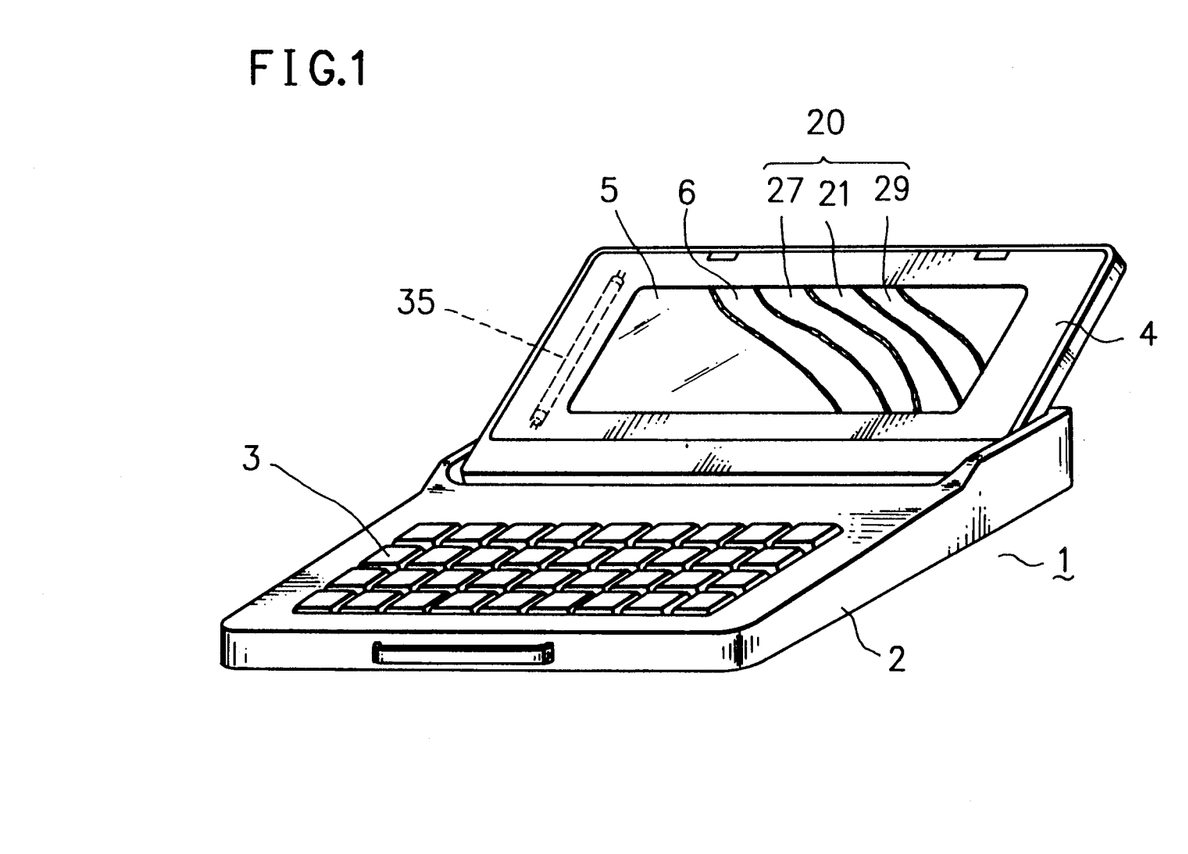
FIG. 1 is a perspective view of a word processor realized by incorporating an embodiment of an edge light panel device of the invention.

The swingable display section 4 has a flat and thin configuration which is approximately 10 millimeters thick and comprises a wide and flat liquid crystal display panel 6 covered by a transparent protective panel 5 arranged on its front side and a surface light source device 10 arranged at the back of the liquid crystal display panel 6 for illuminating the latter from the rear side.

Figure 3:
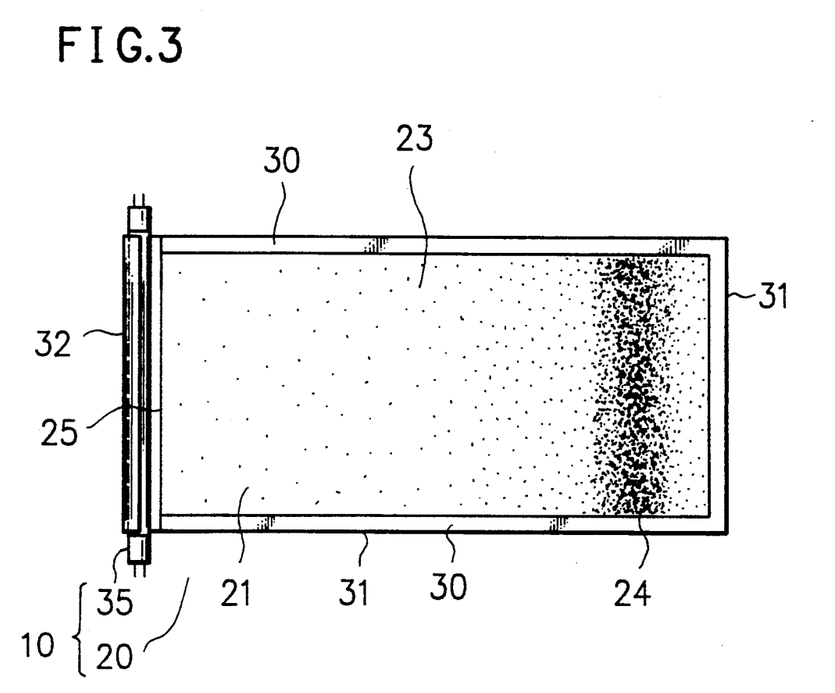
FIG. 3 is a front view of the embodiment of FIG. 2, with a front surface diffusion layer is removed.
Figure 4:
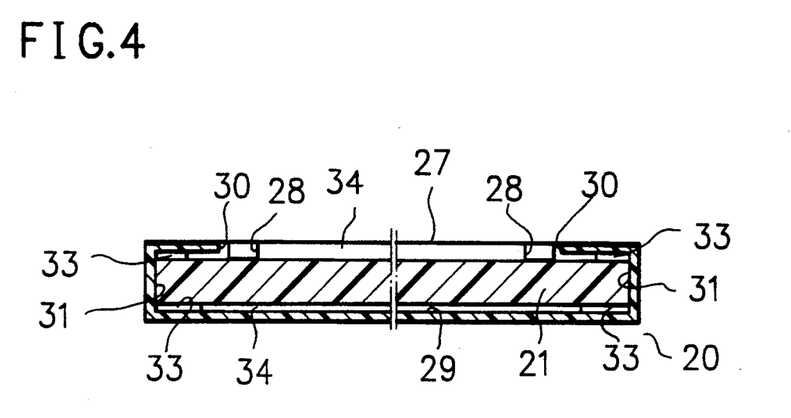
FIG. 4 is a longitudinal sectional view of the embodiment of FIG. 2.

In this embodiment, the surface light source device 10 comprises an edge light panel device 20, a single primary light source 35 arranged at a peripheral edge thereof and an inverter (not shown). The edge light panel device 20 comprises an edge light panel 21, a surface diffusion layer 27 arranged on the front surface, or the surface facing the liquid crystal display panel 6, of the edge light panel 21 to substantially cover said front surface, a rear surface reflection layer 28 arranged on the rear surface of the edge light panel 21 to substantially cover said front surface, a pair of peripheral edge reflection layers 31 arranged along respectively opposite peripheral edges adjacent to the primary light source 35 and a pair of margin reflection layers 30 arranged along the respective opposite edges adjacent to the primary light source 35 on the front surface of the edge light panel 21.

Figure 5:
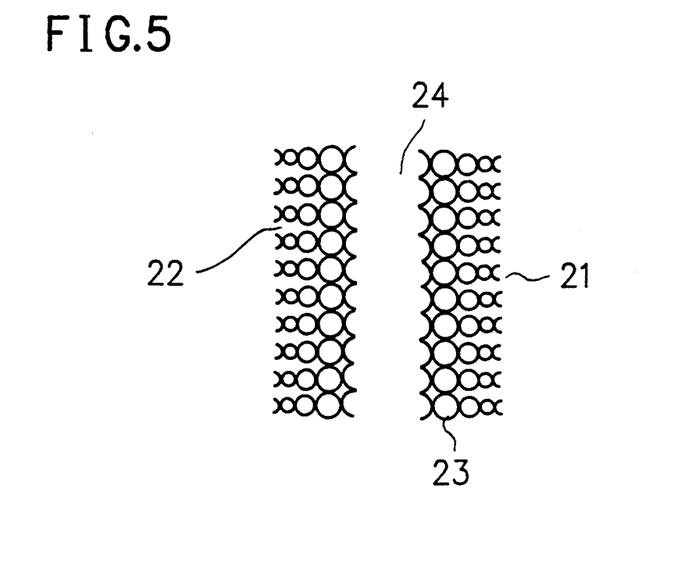
FIG. 5 is an enlarged partial plan view of the irregular reflection means of the embodiment of FIG. 2.

The edge light panel 21 may be constituted by a rectangular transparent acrylic resin substrate 22 which is as large as, for instance, 135×200 millimeters and as thin as 2 millimeters and has a rear surface processed by screen printing to produce a densely dotted, white and slightly transmissive irregular reflection means 23 carrying a pattern of dots of a size that varies continuously on the substantially entire area of the rear surface except the margin.

In the embodiment, the screen printing is conducted by using white ink preferably containing a heating and foaming agent such as azo-bis-butyronitrile or a microsquare type foaming agent, which is caused to give off heat and foam after printing to produce fine bubbles within the ink of the irregular reflection means. Alternatively, white curing ink containing a large number of vacant microcapsules having a diameter of approximately 20 μm may be used to produce a similar effect.

In this embodiment, the area of the dots of the irregular reflection means 23 varies continuously as a function of the distance from the peripheral edge 25 juxtaposed with the primary light source 35 within the range of area ratio of 20 to 100, the zone 24 with the largest dots of the irregular reflection means 23 being arranged at an intermediate position nearer to the peripheral edge opposite to that of the primary light source 35 in order to eliminate any non-uniformity of brightness. The dots having the largest area in this embodiment are densely screen printed to form a densely printed irregular reflection belt 24 having a width that occupies approximately 10% of the lateral length of the panel.

The transparent resin substrate 22 carrying the irregular reflection means 23 as described above is punched out from a large resin sheet to specified dimensions and then the four peripheral edges 25, 26 are smoothed by means of a cutting/finishing machine, for this embodiment PLABEAUTY PB-100 (trade name) available from Asahi Megalo Co., Ltd., to remove any scars brought forth at the time of punching out.

More specifically, the lateral sides (or peripheral edges) 26 except the one 25 with which the primary light source 35 is juxtaposed are cut/finished by a machine as referred to above with a maximum rate of feeding the machine cutter of 1.5 m/min. to provide a mirror finish in order to enhance the reflection factor of the finished lateral sides so that the incident light supplied to the edge light panel 21 is retained within the edge light panel 21 and prevented from escaping to thereby maximize the effect of the peripheral edge reflection layers 31.

In this embodiment, the rear surface reflection layer 29, the margin reflection layers 30 and the peripheral edge reflection layers 31 as well as a light source reflection layer 32 are integrally formed by using a synthetic resin panel. The front surface diffusion layer 27 is laid on and bonded to the integrally formed margin reflection layers 30 so that they cooperate to make a frame for holding the edge light panel 21 and the primary light source 35.

More specifically, the rear surface reflection layer 29, the peripheral edge reflection layers 31 and the margin reflection layers 30 are integrally formed by hot molding using a synthetic resin sheet, preferably a 0.2 to 0.5 millimeter thick white polyvinylchloride sheet. The peripheral edge reflection layers 31 are arranged along the edges 26 of the flat rear surface reflection layer 29 except the one juxtaposed with the primary light source 35 and perpendicular to the rear surface reflection layer 29 to a height slightly greater than the thickness of the edge light panel 21. Then the margin reflection layers 30 are arranged along the free edges of the respective peripheral edge reflection layers 31 so that the margin reflection layers 30 are inwardly directed and parallel with the rear surface reflection layer 29. Further, the edge of the rear surface reflection layer 29 which is juxtaposed with the primary light source 35, or is free of the peripheral edge reflection layers 31 and the margin reflection layers 30, is extended outwardly and rounded inwardly, toward the liquid crystal display panel 6, in order to form a semicircular cross section and define a primary light source reflection layer 32.

The front surface diffusion layer 27 of this embodiment is a pale and resilient polyester sheet having a thickness of 75μ (trade name: Upo, available from Teijin Limited) and each of the three edges of the front surface diffusion layer 27 other than the one juxtaposed with the primary light source 35 is hot pressed to form a plurality of narrow ribs 28 arranged in parallel with the layer 27 and projecting rearwardly therefrom (downwardly in FIG. 4).

The front surface diffusion layer 27 is then laid on the margin reflection layers 30 which are integral with the rear surface reflection layer 29 and the peripheral edge reflection layers 31 and bonded thereto by high frequency welding to form a frame-like holder.

The edge light panel 21 is then inserted into the frame-like holder with interposition of small thin spacers 33 arranged at certain spots on its front and rear surfaces in such a manner that the irregular reflection means 23 faces the rear surface reflection layer 29 so that the edge light panel 21 is located between both the rear surface reflection layer 29 and the front surface diffusion layer 27 with narrow gaps 34 formed therebetween. Then, the primary light source 35 which is a slender, compact and durable 12 V cold cathode ray having a diameter of 3.8 millimeters and a source brightness of 12,000 cd/m$^2$ is fit in the primary light source reflection layer 32.

In an experiment conducted by the inventors of the present invention, the embodiment of the edge light panel device 20 of the invention showed an even brightness of 230 cd/m$^2$, or an improvement by approximately 50% as compared with conventional edge light panel devices. No areas with reduced brightness were observed near the peripheral edge opposite to the primary light source, and the irregular reflection means 23 was not visible through the front surface diffusion layer 27.

Of the 50% improvement, it seems, approximately 20% is contributed by the dense screen printing for the largest dot size zone 24 of the irregular reflection means 23, approximately 10% by the margin reflection layers 30 and approximately 25% by the peripheral edge reflection layers 31 integrally formed with the rear surface reflection layer 29, the remaining being attributable to the coarsely finished peripheral edge juxtaposed with the primary light source 35.

In addition, the arrangement of the margin reflection layers 30 is particularly effective for eliminating the difference in brightness particularly along the peripheral edges adjacent the side juxtaposed with the primary light source 35. The provision of the narrow gaps 34 effectively prevents the irregular reflection means 23 from becoming visible and improves the evenness of the brightness of the device.

Figure 6:
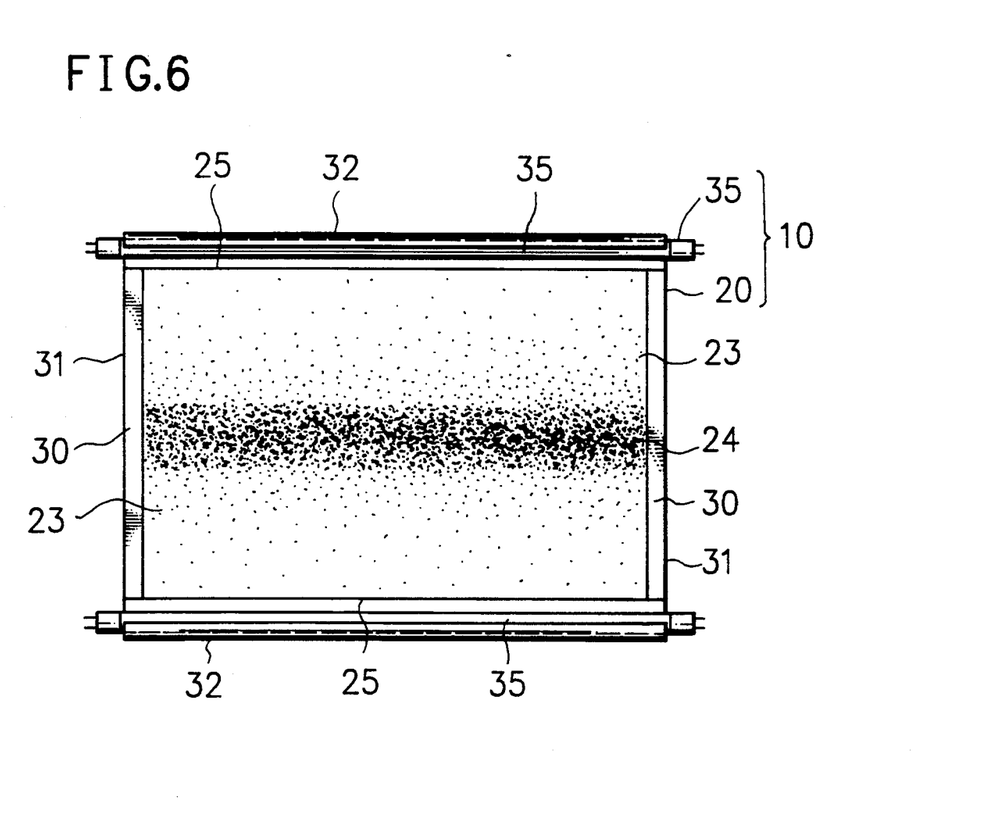
FIG. 6 is a plan view of a second embodiment of the edge light panel device of the invention, with a front surface diffusion layer removed.

FIG. 6 illustrates a second embodiment of the edge light panel device of the invention, wherein a pair of primary light sources 35 are arranged adjacent opposing peripheral edges 26 of an edge light panel 21, and the smoothly differentiated dot size of the dotted pattern of its irregular reflection means 23 varies as a function of the distance from such peripheral edges with, the zone 24 having the largest dot area being horizontally located at the middle. The width of the densely printed belt zone 12 for the largest dot area of the irregular reflection means 23 occupies approximately 20% of the height, or the length of the peripheral edges juxtaposed with the respective primary light sources 35, of the edge light panel 21. In this embodiment, a pair of primary light source reflection layers 32 are formed integrally with the rear surface reflection layer 29 to accommodate the respective primary light sources 35.

Since this second embodiment is similar to the first embodiment in the other respects, the components similar to those of the first embodiment are indicated by identical reference numerals and will not be described here any further. This embodiment has also proved to be very effective in improving the evenness of brightness due to the arrangement of its components as in the case of the first embodiment.

Figure 7:
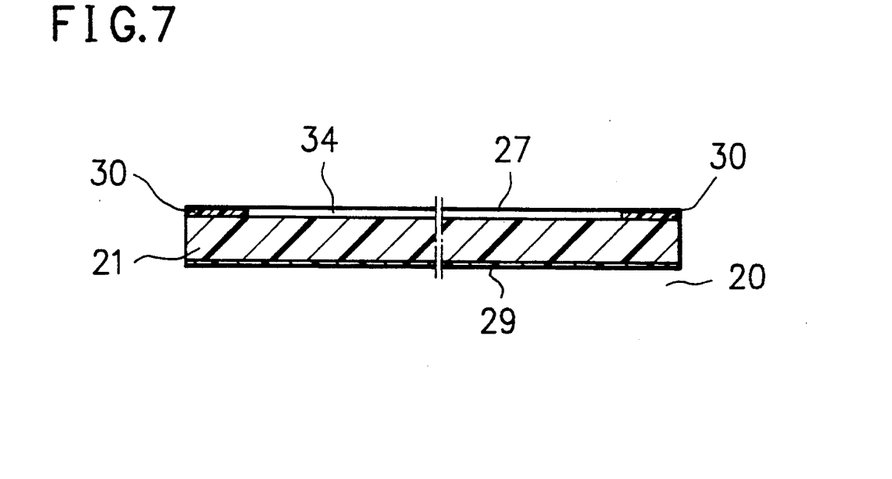
FIGS. 7 through 9 are longitudinal sectional views of different embodiments of the invention.
Figure 8:
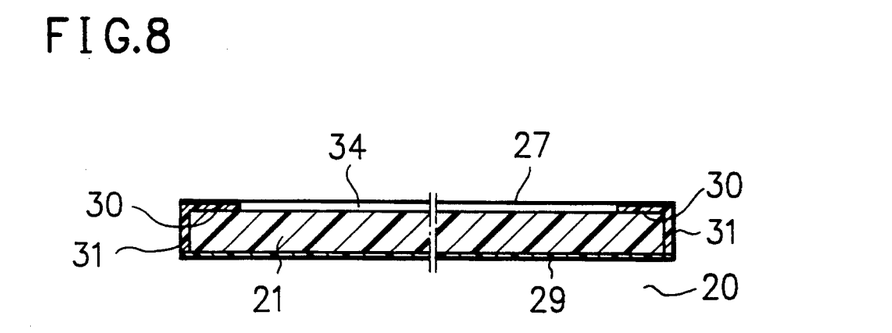
Figure 9:
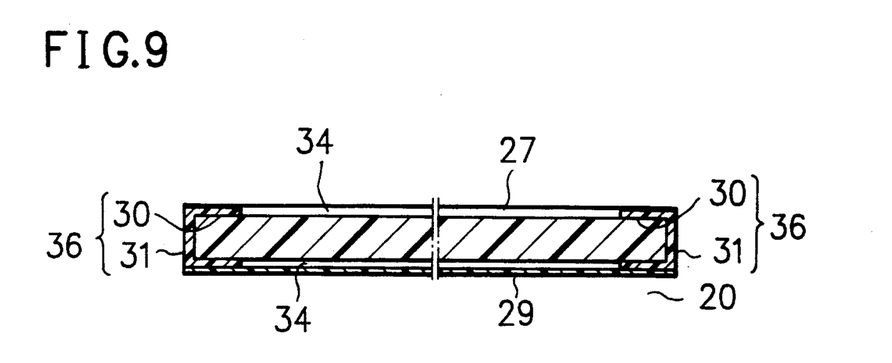

FIGS. 7 through 9 illustrate three different embodiments of the edge light panel device of the present invention. Of these, FIG. 7 shows an embodiment where the margin reflection layers 30 and the rear surface reflection layer 29 are separately prepared and fitted to an edge light panel 21 in contact with it, whereas a narrow gap 34 is arranged only between the edge light panel 21 and the front surface diffusion layer 27 which is arranged on the former with the interposition of the margin reflection layers 30.

In FIG. 7 where the separately prepared peripheral edge reflection layers 31 are not shown, the margin reflection layers 30 are white polyvinylchloride tapes adhered to the edge light panel 21, whereas the rear surface reflection layer 29 is a lowly foamed polyester sheet (available from Toray Industries, Inc. with film lot No. 010805207) applied to the edge light panel 21 to improve the reflectivity of the latter. The lowly foamed polyester sheet is 99% white (83% for the unfoamed version) and has a reflection factor of 97% (88% for the unfoamed version), a specific gravity of 0.80 g/cm$^3$ (1.49 g/cm$^3$ for the unfoamed version) and a thickness of 188 μm.

The embodiment illustrated in FIG. 8 is realized by first continually applying a white vinylchloride tape as described above to the front surface margin and the peripheral edges of an edge light panel 21 to integrally form margin reflection layers 30 and lateral peripheral edges reflection layers 31. A front surface diffusion layer 27 is then arranged on the front surface of the edge light panel 21 with the interposition of the margin reflection layers 30 to provide a narrow gap 34 between the front surface diffusion layer 27 and the edge light panel 21. A rear surface reflection layer 29 made of a lowly foamed polyester sheet is arranged in contact with the rear surface of the edge light panel 21 so that a frame-like holder is consequently formed.

The embodiment shown in FIG. 9 is realized by molding or bending a 0.2 to 0.5 millimeter thick vinylchloride resin panel into a channel 36 having a U-shaped cross section and provided with margin reflection layers 30 and peripheral edge reflection layers 31, and then bonding to the channel 36 a rear surface reflection layer 29 made of a lowly foamed polyester sheet and a front surface diffusion layer 27 in so many layers to form a frame-like holder that provides narrow gaps between the edge light panel 21 and the front surface diffusion layer 27 and the rear surface reflection layer 29 due to the thickness of the vinyl-chloride resin panel.

Figure 10:
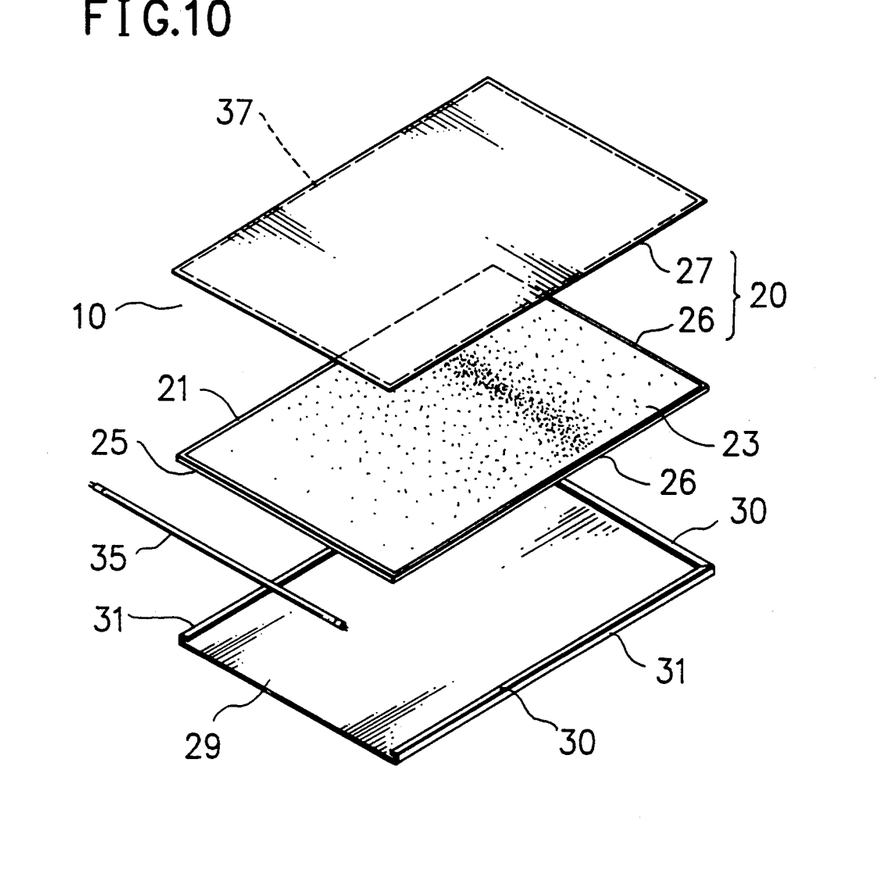
FIG. 10 is an exploded perspective view of still another embodiment of the edge light panel of the invention.
Figure 11:
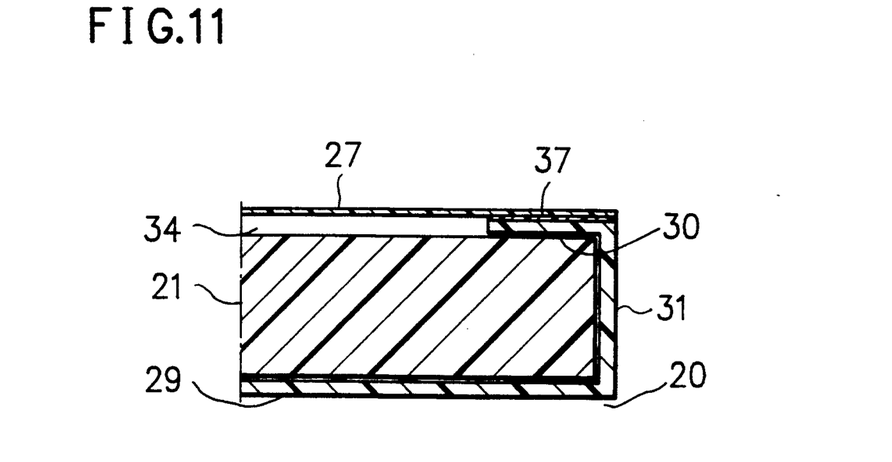
FIG. 11 is an enlarged longitudinal partial sectional view of the embodiment of FIG. 10.

FIGS. 10 and 11 show still another embodiment, wherein the margin reflection layers 30, the peripheral edge reflection layers 31 and the rear surface reflection layer 29 are integrally formed by bending a synthetic resin sheet, and then the front surface diffusion layer 27 is bonded thereto to provide an additional layer.

The synthetic resin sheet used to integrally form the margin reflection layers 30, the lateral side reflection layers 31 and the rear surface reflection layer 29 of this embodiment is a white polyester sheet.

The front surface diffusion layer 27 and the margin reflection layers 30 are bonded together into a two-layered structure in the following manner. Firsts, a printing ink is prepared by adding a thermoplastic resin material to an ink vehicle material. Then, the ink is applied to the surface of the margin reflection layers 30 and that of the front surface diffusion layer 27 to form on each of them a narrow curing ink layer 37 having a width of 1 to 2 millimeters. Thereafter, the front surface diffusion layer 27 is laid on the margin reflection layers 30, and they are then hot pressed and bonded together by the curing ink layer 37 to consequently form a frame-like holder.

It should be noted that the irregular reflection means 23 does not carry a very densely printed zone and therefore a narrow gap 34 is provided to produce a clearance equal to the thickness of the margin reflection layers 30.

Figure 12:
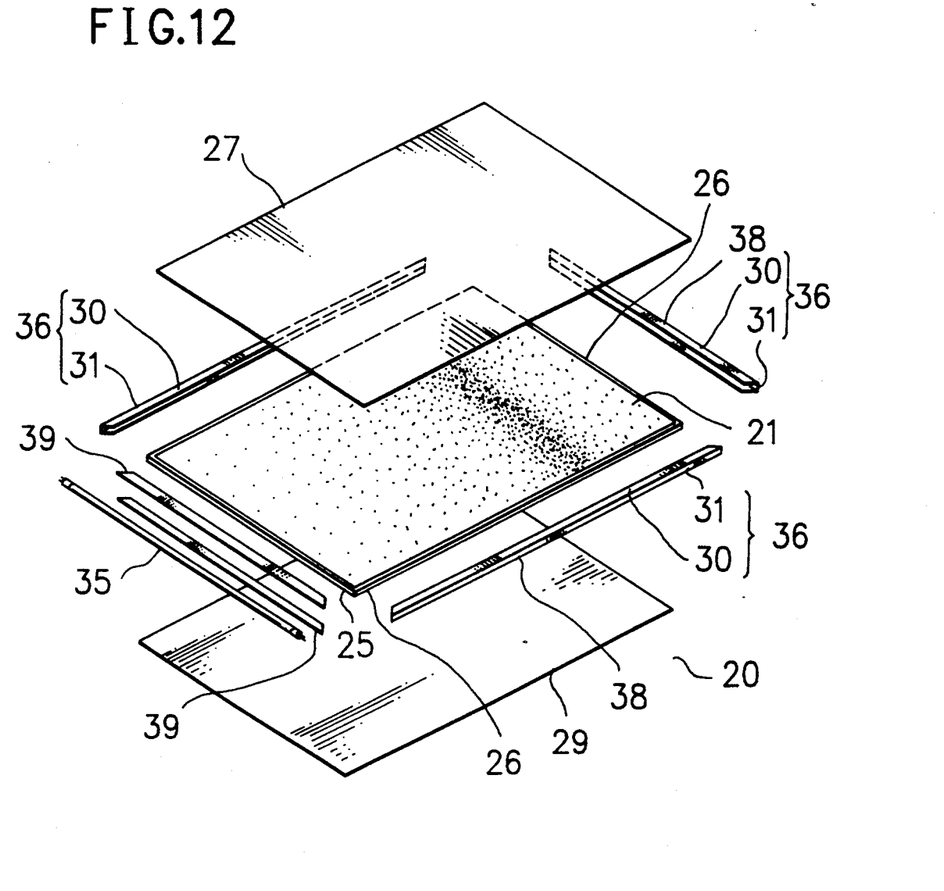
FIG. 12 is an exploded perspective view of still another embodiment of the edge light panel of the invention.
Figure 13:
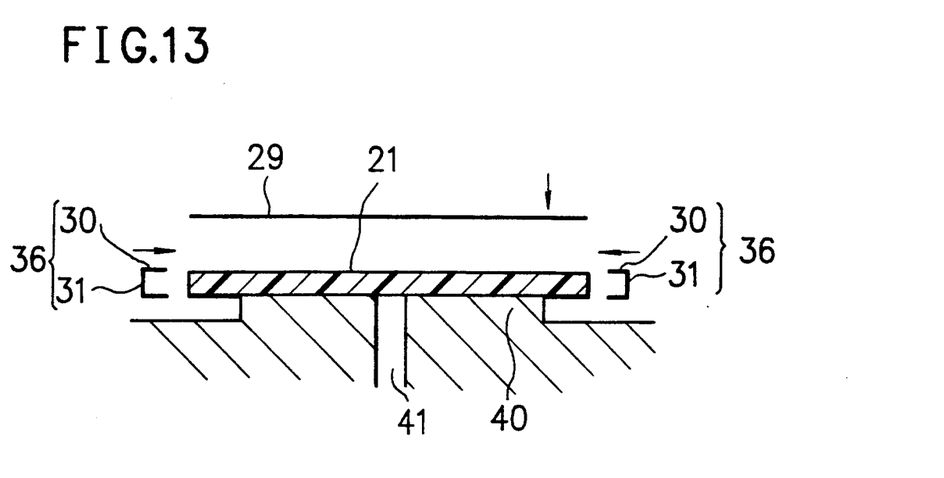
FIG. 13 is a longitudinal partial sectional view of the embodiment of FIG. 12, showing how it is assembled.

For the embodiment shown in FIGS. 12 and 13, three channels 36, each comprising a margin reflection layer 30 and a peripheral edge reflection layer 31, are formed from a 0.3 millimeter thick synthetic resin plate. Then, the rear surface reflection layer 29 is bonded along its three edges to the channels 36, while the front surface diffusion layer 27 is bonded to the margin reflection layers 30 of the channels 36 in so many layers. For the bonding operation, a curing resin layer 38 of a thermoplastic resin material is applied by screen printing to the appropriate locations of the channels, which are then hot pressed against the front surface diffusion layer 27 and the rear surface reflection layer 29 to consequently form a frame-like holder. For manufacturing this embodiment, an edge light panel 21 is placed on an elevated flat table 40 provided with several air suction ports 41 and securely anchored to the table by drawing air out of the port. Then, the three channels, to whose surface the thermoplastic resin material is applied, are press fit to the respective peripheral edge of the edge light panel 21, while a bonding member 39 carrying an adhesive material on both sides is applied to the upper edge of the lateral side for the primary light source 35. Thereafter, the rear surface reflection layer 29 is fitted from above to the edge light panel 21 by way of the margin reflection layers 30 and the bonding member to form an additional layer. These components are then pressed by a hot roller for bonding. Next, the edge light panel 21 is turned upside down so that the rear surface reflection layer 29 is under the edge light panel 21, and another bonding member 39 is applied to the upper edge of the peripheral edge along for the primary light source 35. After placing the front surface diffusion layer 27 on the edge light panel 21 by way of the margin reflection layers 30 and the bonding member 39, the components are pressed by a hot roller to complete the manufacturing process.

The materials that can be used for narrow margin reflection layers for the purpose of the present invention include, besides white vinylchloride and polyester, highly reflective white and silver resins and metals as well as other materials which are surface treated for high reflectivity or directly coated with a reflective agent, although the reflectivity of materials coated with a reflective agent may be somewhat lower than that of the other listed materials.

A margin reflection layer for the purpose of the invention is advantageously formed integrally with a peripheral edge reflection layer for ease of manufacturing operation, especially when a particularly thin edge light panel is used.

When all the margin reflection layers, the peripheral edge reflection layers and the rear surface reflection layer are continually and integrally formed, a 0.2 to 0.5 millimeter thick white vinylchloride sheet, a white polyester sheet or a lowly foamed white polyester sheet as described above is advantageously bent and shaped to an intended configuration for ease of manufacturing.

Alternatively, an integral part may be molded by using a different material and thereafter covered on its edge light panel side by a lowly foamed polyester sheet, a metal foil or a sheet of a coating agent. The integral part may alternatively be covered by a sheet of an appropriate synthetic resin material or coated with an appropriate synthetic resin material to form a rigidly bonded surface layer.

In another alternative, the margin reflection layers, the peripheral edge reflection layers, the rear surface reflection layer and the front surface diffusion layer are continually and integrally formed from a single synthetic resin material into a bag-like configuration which is open only at the peripheral edge along for the primary light source. Such an arrangement will provide a particularly advantageous method of manufacturing of edge light panels and be effective for protecting the edge light panel against dirt that can be attracted toward its surface by accumulated static electric charges. Alternatively, the components may be made of different synthetic resin materials and bonded together into a multi-layered configuration. The components other than the front surface diffusion layer may be integrally molded using a third material, and the molded piece may be coated with a highly reflective material.

A narrow gap arranged between the edge light panel and the front surface diffusion layer and/or the rear surface reflection layer is particularly effective to prevent the irregular reflection means from becoming visible and to enhance the evenness of brightness. Such a narrow gap is normally less than 1 millimeter and preferably between 0.2 and 0.5 millimeters and can be produced by means of ribs, thin spacers and channels as described above, although other means may also be employed so long as they can produce a gap between the edge light panel and the front surface diffusion layer or the rear surface reflection layer. Such means may include steps and small projections arranged on the margin reflection layers, the front surface diffusion layer and/or the edge light panel.

While it is preferable that the outer periphery of the primary light source be covered by a primary light source reflection layer, such a reflection layer may be formed as an extension of the rear surface reflection layer as described earlier. Alternatively, an edge of a separately prepared reflection layer ma be bonded to the corresponding edge of the rear surface reflection layer to form an additional layer.

The curing ink layer or curing resin layer as described earlier advantageously has a width of approximately 1 to 2 millimeters in order to carry out the bonding operation of putting the components together without a problem. Such a narrow layer hardly absorbs irregularly reflected light beams at or near the related edge of a component on which it is applied. Therefore, the curing ink or resin does not necessarily need to be transparent or white and may be slightly colored so long as it is not detrimental to the reflectivity of the ink or resin layer.

The operation in bonding the components of a bag-shaped holder by applying curing ink or resin should be limited to the outer peripheral area of the edge light panel in order to avoid any disturbances in the light emitted from the edge light panel caused by irregular reflection. Such operation should preferably be conducted on three or all four edges of the edge light panel to protect the panel against dirt that can be attracted to the panel surface, since the possibility of attracting dirt to the panel surface remains high if the operation is conducted only on an edge.

A transparent substrate to be used for the purpose of the present invention may be made of, beside acrylic resin, a material having a high transmittivity of light such as polycarbonate resin. The irregular reflection means may be formed by shot blasting, exposure of sensitized paper or a technique other than screen printing. Moreover, the edge light panel may be of various form, including circular. Therefore, the irregular reflection means, the margin reflection layers, the front surface diffusion layer, the rear surface reflection layer and the narrow gaps of an edge light panel device according to the present invention, as well as the edge light panel itself, may be varied from the above described embodiments in terms of material, structure, configuration, size, and manufacturing and processing methods without departing from the spirit and scope of the present invention.

As is apparent from the above description, an edge light panel device according to the invention provides very even brightness due to the provision of margin reflection layers and narrow gaps that make the irregular reflection means totally invisible from outside. Furthermore, the provision of a bag-shaped holder effectively protects the edge light panel against dirt that can be otherwise attracted to the panel surface.

What is claimed is:

1. An edge light panel device for use with at least one primary light source, comprising:
   an edge light panel formed of a transparent substrate having a means for irregular reflection and a plurality of peripheral edges, at least one of said plurality of peripheral edges being adapted to be juxtaposed with the at least one primary light source;
   a front surface diffusion layer arranged along a front surface of said edge light panel to substantially cover said front surface;
   a rear surface reflection layer arranged along a rear surface of said edge light panel to substantially cover said rear surface;
   a pair of peripheral edge reflection layers respectively arranged along a first opposite pair of said peripheral edges which extend away from said at least one of said peripheral edges which is adapted to be juxtaposed with the at least one primary light source;
   a pair of margin reflection layers respectively arranged along said first opposite pair of said peripheral edges in covering relation to marginal portions of said front surface of said edge light panel;
   wherein said margin reflection layers and aid peripheral edge reflection layers are respectively formed together in the form of channels which surround the peripheral edges and marginal portions of said edge light panel;
   wherein said front surface diffusion layer is bonded to said channels; and
   wherein a screen printed ink layer or resin layer is interposed between said front surface diffusion layer and each of said channels.

2. An edge light panel device according to claim 1, wherein said margin reflection layers are respectively formed continuously and integrally with said peripheral edge reflection layers.

3. An edge light panel device according to claim 2, wherein said margin reflection layers and said peripheral edge reflection layers are formed of a molded or bent synthetic resin.

4. An edge light panel device according to claim 3, wherein said synthetic resin panel comprise a thin vinyl-chloride panel coated with a white or silver coating agent.

5. An edge light panel device according to claim 1, wherein said margin reflection layers are respectively formed continuously and integrally with said peripheral edge reflection layers, and said peripheral edge reflection layers are respectively formed continuously and integrally with edges of said rear surface reflection layer.

6. An edge light panel device according to claim 1, wherein said margin reflection layers are respectively formed continuously and integrally with said peripheral edge reflection layers, said peripheral edge reflection layers are respectively formed continuously and integrally with edges of said rear surface reflection layer, and said front surface diffusion layer is bonded to said margin reflection layers to provide an additional layer.

7. An edge light panel device according to claim 1, wherein said margin reflection layers comprise belts of white or silver synthetic resin, metal foil or a coating agent.

8. An edge light panel device according to claim 7, wherein said belts of synthetic resin comprise white vinylchloride tapes.

9. An edge light panel device according to claim 1, wherein said front surface diffusion layer comprise a white polyester sheet.

10. An edge light panel device according to claim 1, wherein said rear surface reflection layer comprise a white polyester sheet or a lowly foamed white polyester sheet.

11. An edge light panel device according to claim 1, wherein said channels are formed from a white or silver vinyl-chloride sheet.

12. An edge light panel device according to claim 1, wherein said channels are formed from a white polyester sheet or a lowly foamed polyester sheet.

13. An edge light panel device according to claim 1, wherein a narrow gap is provided between said edge light panel and said front surface diffusion layer.

14. An edge light panel device according to claim 1, further comprising
   a primary light source reflection layer mounted to said edge light panel so as to extend on a side of the primary light source opposite said peripheral edge adapted to be juxtaposed with the primary light source.

15. An edge light panel device according to claim 14, wherein
   said primary light source reflection layer is formed integrally with and is an extension of said rear surface reflection layer.

16. An edge light panel device according to claim 1, wherein
   said margin reflection layers and said peripheral edge reflection layers are formed of a single bent synthetic resin sheet.

17. An edge light panel device according to claim 16, wherein said sheet of a synthetic resin material comprise a sheet of white polyester or lowly foamed white polyester.

18. An edge light panel device according to claim 1, wherein said peripheral edge reflection layers are bonded to respective ones of said peripheral edges of said edge light panel, and said margin reflection layers are respectively bonded to said front and rear surfaces of said edge light panel.

19. An edge light panel device according to claim 1, wherein a narrow gap is provided between said edge light panel and said rear surface reflection layer.

* * * * *